US009396430B2

(12) United States Patent
Huang

(10) Patent No.: US 9,396,430 B2
(45) Date of Patent: Jul. 19, 2016

(54) FRAGMENT COUNTING AND CONTROL SYSTEM

(71) Applicant: Jian Huang, Beijing (CN)

(72) Inventor: Jian Huang, Beijing (CN)

( * ) Notice: Subject to any disclaimer, the term of this patent is extended or adjusted under 35 U.S.C. 154(b) by 24 days.

(21) Appl. No.: 14/400,077

(22) PCT Filed: Sep. 4, 2013

(86) PCT No.: PCT/CN2013/001038
§ 371 (c)(1),
(2) Date: Nov. 10, 2014

(87) PCT Pub. No.: WO2014/056295
PCT Pub. Date: Apr. 17, 2014

(65) Prior Publication Data

US 2015/0110238 A1 Apr. 23, 2015

(30) Foreign Application Priority Data

Oct. 8, 2012 (CN) .......................... 2012 1 0374239

(51) Int. Cl.
*G05B 19/07* (2006.01)
*G06M 1/10* (2006.01)
*G06M 1/272* (2006.01)
*G06M 7/00* (2006.01)

(52) U.S. Cl.
CPC .............. *G06M 1/108* (2013.01); *G06M 1/272* (2013.01); *G06M 7/00* (2013.01)

(58) Field of Classification Search
None
See application file for complete search history.

(56) References Cited

U.S. PATENT DOCUMENTS 5,365,559 A * 11/1994 Hsueh ................ G01N 15/0205 377/10
6,078,635 A * 6/2000 DuBois ................ G06M 1/101 377/6

* cited by examiner

*Primary Examiner* — Long Nguyen
(74) *Attorney, Agent, or Firm* — Wayne & King LLC

(57) ABSTRACT

A fragment counting and control system, consisting of mechanical and electronic components such as a fragment counting execution mechanism, a sensor platform, various sensors, a signal counting and processing instrument, a timer, a motor driver and the like. A fragment falls onto the sensor platform from the outlet of the fragment counting execution mechanism, such that the sensor on the sensor platform generates a signal; the signal is transmitted to the signal counting and processing instrument; the signal counting and processing instrument processes the signal and compares the processed signal with a preset value; the processing instrument transmits a control signal to the timer and the motor driver according to the ratio; the timer controls the motor driver to start and stop; the motor driver processes the processing instrument signal, and transmits a driver signal to the motor; and the motor changes rotation according to the driver signal so as to drive a vertical shaft to change rotation, thus controlling the frequency of falling fragments.

17 Claims, 7 Drawing Sheets

D—D Cross-sectional view

FRAGMENT COUNTING AND CONTROL SYSTEM

CROSS-REFERENCE TO RELATED APPLICATIONS

This application is the national phase application of PCT/CN2013/001038 having an international filing date of Sep. 4, 2013, which claims the benefit of Chinese Application 201210374239.6 filed Oct. 8, 2012. The contents of PCT/CN2013/001038 and 201210374239.6 are incorporated by reference in their entirety.

TECHNICAL FIELD

The present invention relates to a particle counting and controlling system.

BACKGROUND OF THE PRESENT INVENTION

At present, counters available in the market mainly focus on the regular pulse, such as coding systems or the like. There are limited researches on counters for irregular signals.

SUMMARY OF THE PRESENT INVENTION

An objective of the present invention is to provide a particle counting and controlling system which has the following characteristics:

1. a dedicated particle counting actuator,
2. a dedicated sensor platform,
3. a plurality of appropriate sensors,
4. a dedicated signal count processing apparatus,
5. a controllable motor and a driving circuit, and
6. a mechanical-electrical integration.

The objective of the present invention is realized in the following way. The whole system consists of a particle counting actuator, a sensor platform, a plurality of sensors, a dedicated signal count processing apparatus, a timer, a motor drive, a controllable motor and other mechanical and electronic components. Particles fall onto the sensor platform from an outlet of the particle counting actuator so that a signal is generated within the sensors on the sensor platform. The signal is then transmitted to the signal count processing apparatus which processes the signal, compares the signal with a set value, and sends a control signal to the timer or the motor drive based on the ratio. The timer controls the startup or stop of the motor. The motor drive processes the control signal and then sends a signal to the motor. The motor changes the rotating speed according to the signal from the drive to drive a vertical shaft of the particle counting actuator to change in the rotating speed so that the quantity of particles falling from the particle counting actuator in unit time changes.

There is a vertical shaft provided, which is mounted within a bushing on a container lid and in clearance fit with the bushing to be able to move up and down and rotate within the bushing, in the center of an inverted-frustum type material container of the particle counting actuator. The vertical shaft is at a lower end thereof provided with a stirring tip having a shape being a portion of a right circular cone envelope, that is, a middle shaft tube of the stirring tip, having on each of two sides thereof a right-triangular frame separately welded, is connected with a rotatable semicircular sheet like a hinge by using the bottom edge and of the two right-triangular frames as a pivot. The middle shaft tube and the lower end of the vertical shaft are secured in a manner of concave-convex fit via a positioning member.

The bushing is mounted within a bearing seat on the container lid and able to rotate vertically. A portion of a lower portion of the bushing extending out from the container lid is provided with a gear which forms a transmission pair together with a gear on the motor extending out from the container lid. The motor is mounted on the container. A handwheel has at a lower end thereof, which is mounted at the upper end of the vertical shaft and in concave-convex clearance fit with the vertical shaft, helical teeth forming a clutch together with helical teeth provided at an upper end of the bushing. When the clutch between the vertical shaft and the bushing is engaged, the rotation of the vertical shaft is driven by the motor via a gear. When the clutch is disengaged, the rotation of the vertical shaft is driven by the handwheel.

At a small end of the inverted-frustum type material container, there are two overlapped bottom portions. The upper bottom portion is integrated with the container, with a segment of cylinder between the upper bottom portion and the container, one end of an upper bottom portion being integrally welded with the small end of the inverted-frustum type material container while the other end thereof being welded with a circular flange. In the cylinder, there is a movable circular double-sheet component is provided. A horizontal shaft and in clearance fit with a corresponding hole on the cylindrical wall is separately provided at two diameter ends and an extension line of the top sheet. A short vertical shaft tube is provided in the center of the lower surface of the top sheet. The bottom sheet is mounted on the excircle of the short vertical shaft tube and able to horizontally gyrate about the short vertical shaft tube. A central hole is formed on the top sheet with sectorial holes formed around the central hole. The bottom sheet is sectorial, and has a magnet mounted below. A fixed base is provided outside the cylindrical wall, and the fixation of the double-sheet component is realized by a stretchable positioning pin mounted on the rocker arm and the fixed base in a manner of concave-convex or friction fit in aid of magnetic suction. The rocker arm is in concave-convex transition fit with the horizontal shaft. A gyratory magnet is mounted on the periphery of the upper bottom portion. The peripheral magnet has a same height as the magnet of the bottom sheet. The normal working state is horizontal.

The lower bottom portion is completely independent. The upper and lower end faces of the lower bottom portion are also circular flanges, a segment of cylindrical wall in which a movable circular double-sheet component is provided is reserved between the upper and lower end faces. Bearing seats and are provided at two ends of the upper surface of the bottom sheet, and short shafts and in clearance fit with the bearing seats and are provided at two ends of the upper sheet. The upper sheet is able to swing about the short shafts and. A horizontal shaft and in clearance fit with a corresponding hole on the cylinder thin wall is separately provided at two diameter ends and an extension line of the top sheet and the bottom sheet may turn over about the horizontal shaft. A torque required by the turnover of the bottom sheet is provided by a rocker arm mounted at one end of the horizontal shaft extending out from the cylindrical wall, and a fixed base having sectorial orifice plates thereon is provided outside the wall of the container. The fixation of the bottom sheet is realized by a stretchable positioning pin mounted on the rocker arm and the sectorial orifice plates on the fixed base in a manner of concave-convex or friction fit in aid of magnetic suction. The rocker arm is in concave-convex transition fit with the horizontal shaft. The normal working state of the circular double-sheet component is oblique. The circular sheets may be of frame or net structures.

In the circular double-sheet component within the lower bottom portion, provided are a pressure or vibration or sound sensor, as well as an acceleration sensor and an infrared sensor. Particles fall onto the sensor platform so that a signal is generated within the sensors. The signal is then transmitted by the sensor to the dedicated signal count processing apparatus for processing.

The signal count processing apparatus consists of a charge amplifier, a high-pass filter, a wave shaping circuit, a counting circuit, a feedback control circuit, a serial communication circuit and keys on a display screen.

DETAILED DESCRIPTION OF THE PRESENT INVENTION

The present invention will be further described as below with reference to the accompanying drawings by specific embodiments.

Figure 1:
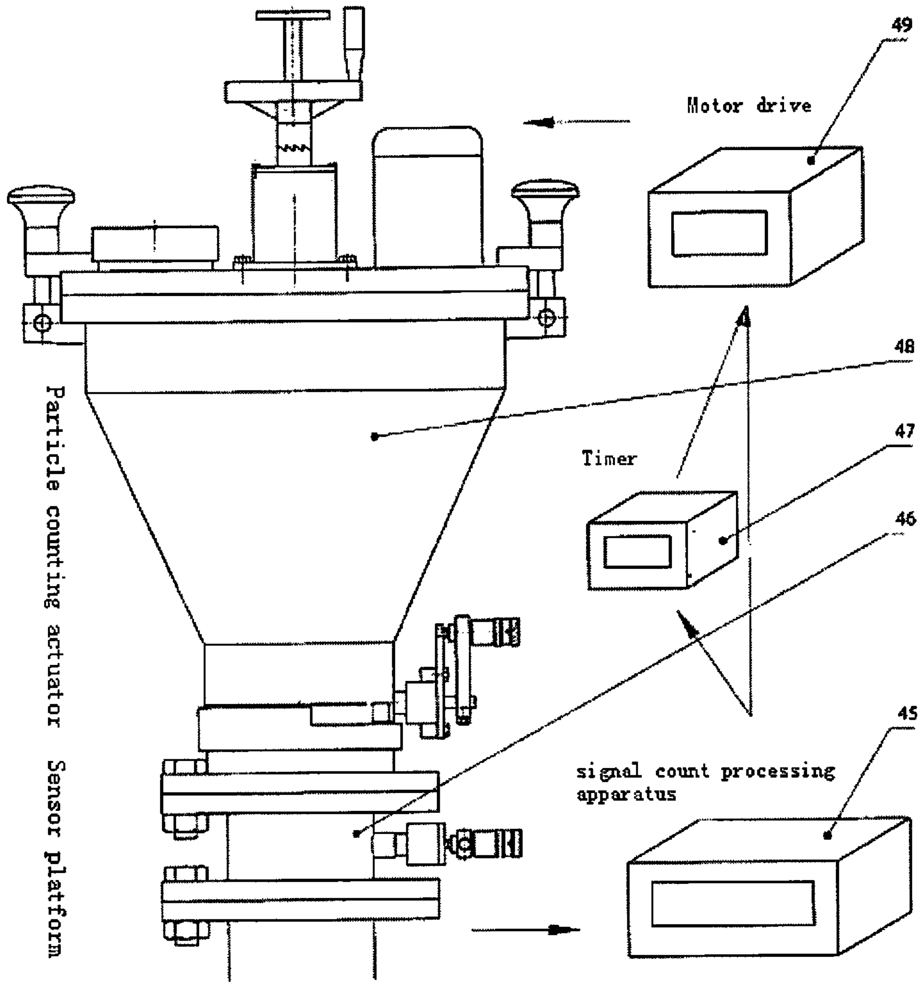
FIG. 1 is a schematic diagram of a particle counting and controlling system according to the present invention.
Figure 2:
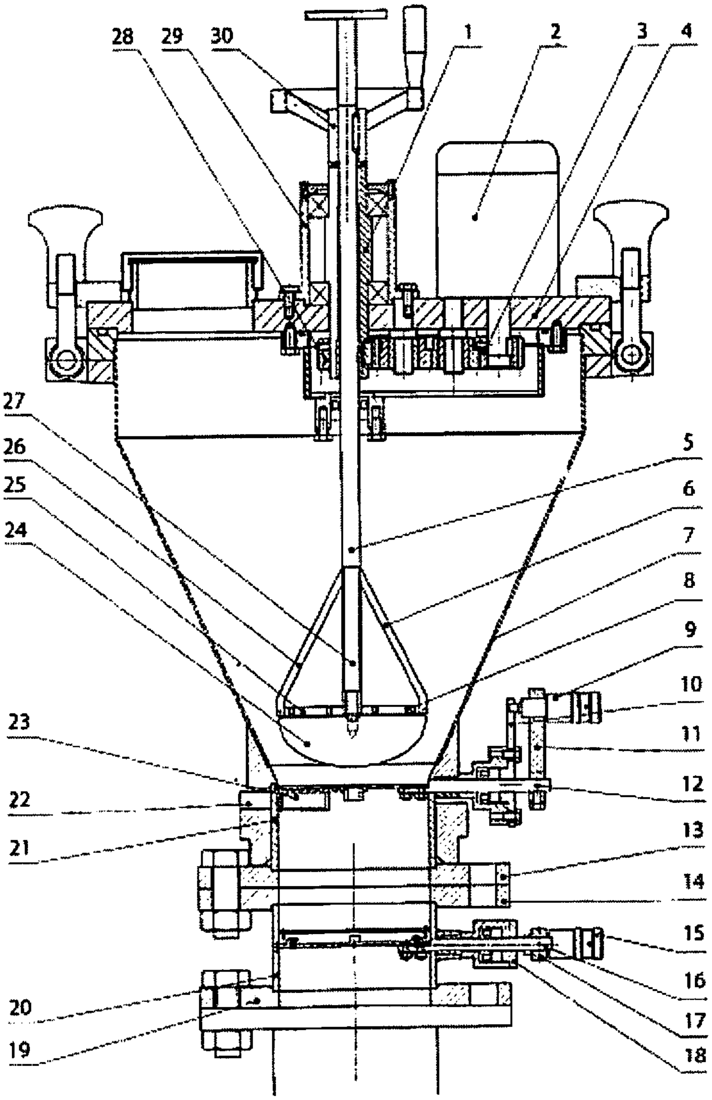
FIG. 2 is a primary cross-sectional view of the particle counting actuator and a sensor platform according to the present invention.
Figure 3:
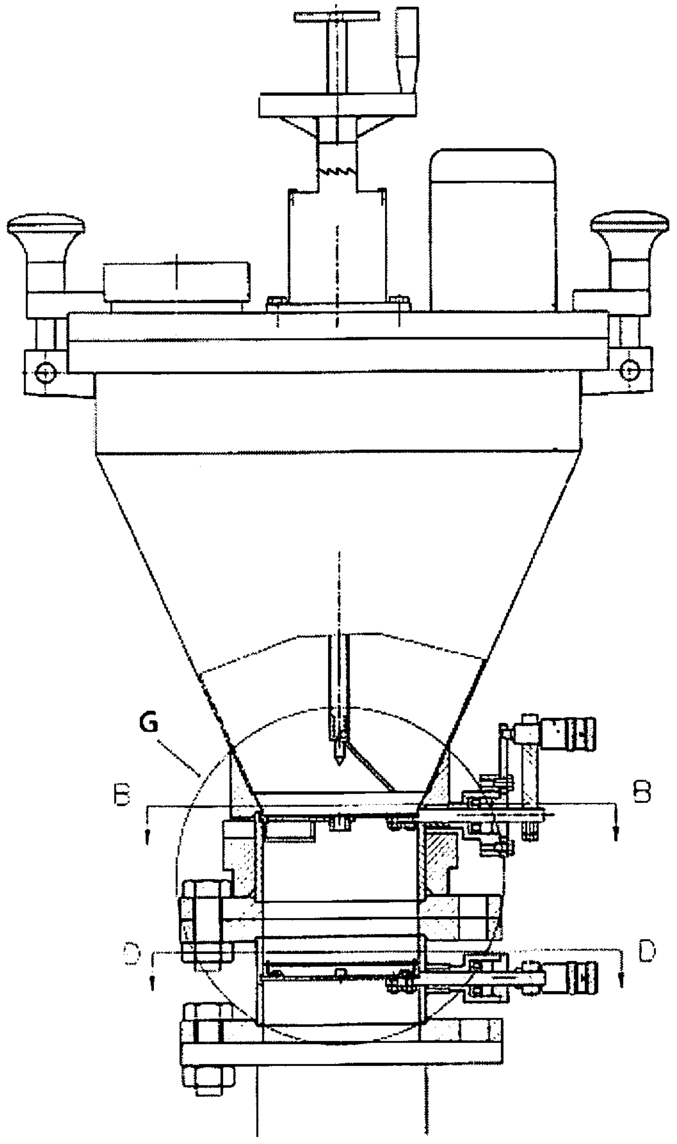
FIG. 3 is a partial cross-sectional view of the particle counting actuator and a sensor platform according to the present invention.
Figure 4:
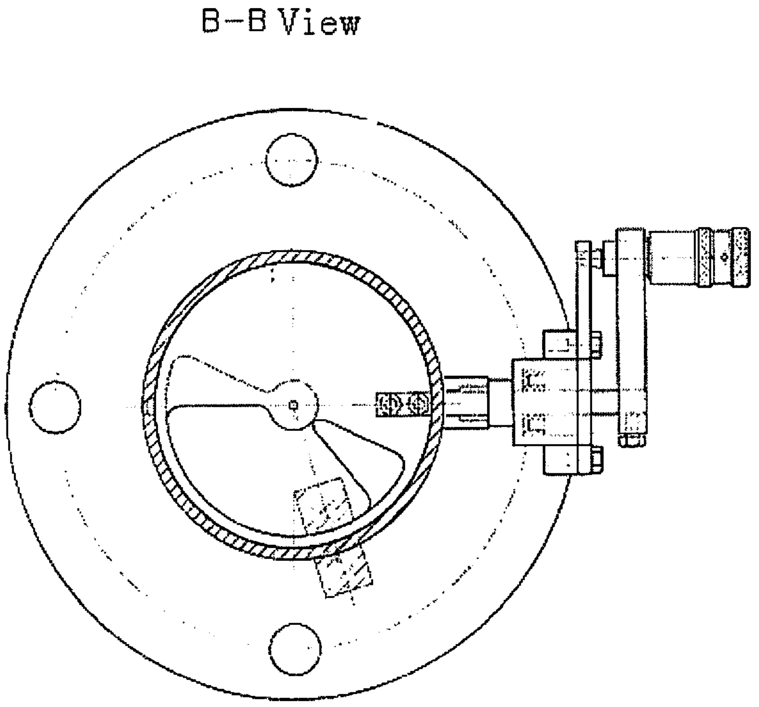
FIG. 4 is a view of the bottom of the particle counting actuator taken along B-B according to the present invention.
Figure 5:
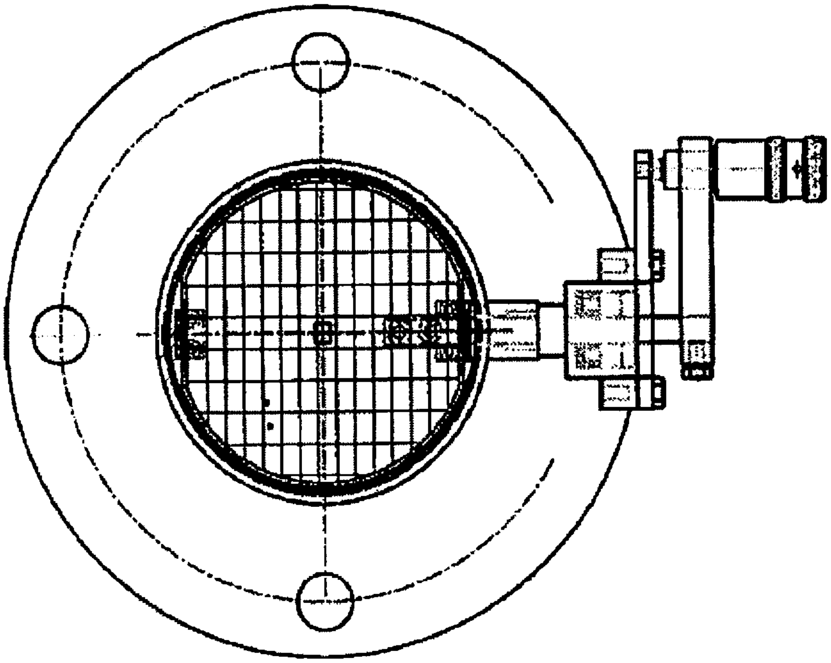
FIG. 5 is a cross-sectional view of the sensor platform taken along D-D according to the present invention.
Figure 6:
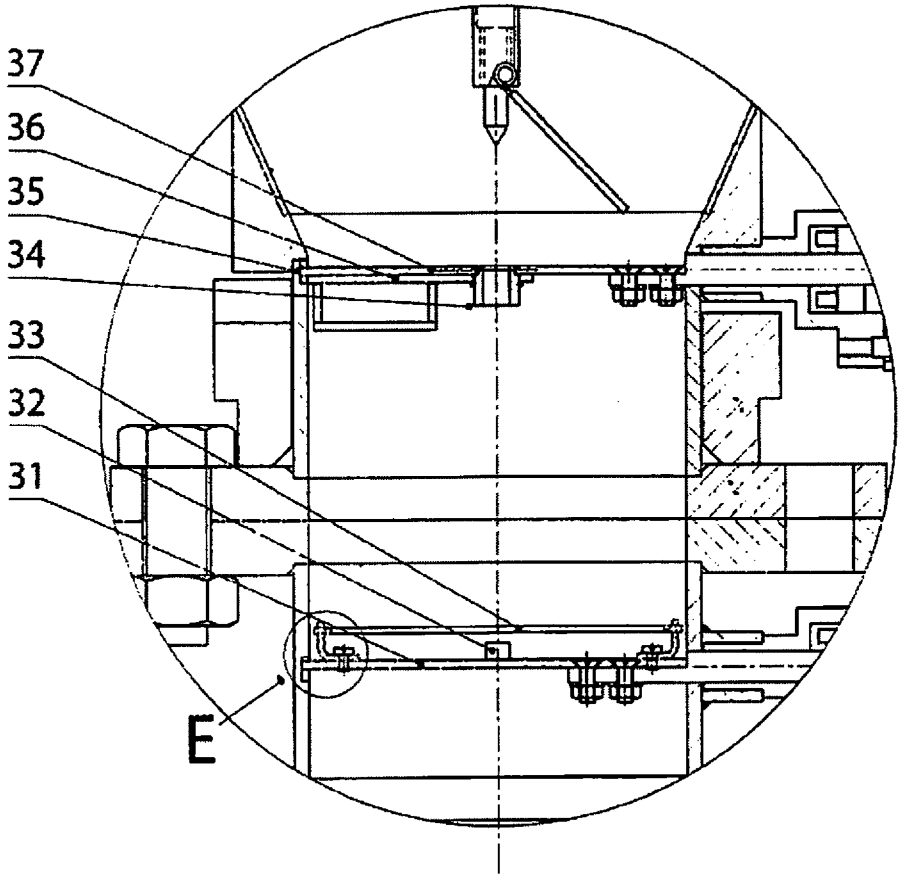
FIG. 6 is a partial view of the particle counting actuator and the sensor platform taken along G according to the present invention.
Figure 7:
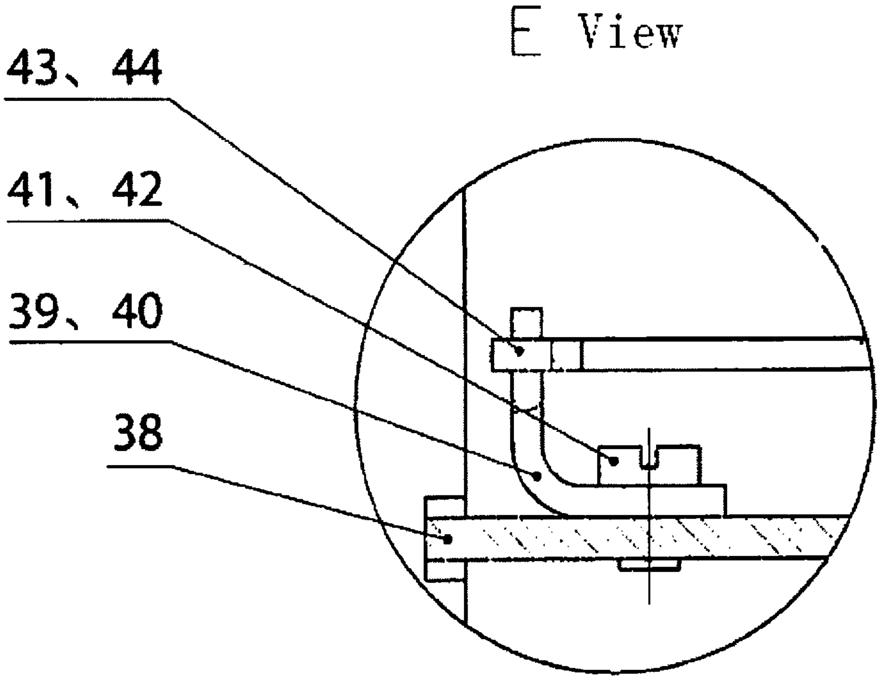
FIG. 7 is a partial view of the sensor platform taken along E according to the present invention.

As illustrated in the FIGS. 1, 2, 3, 4, 5, 6 and 7, a particle counting and controlling system is described. In the mechanical portion of the system, there is a vertical shaft 5 provided, which is mounted within a bushing 1 on a container lid 4 and in clearance fit with the bushing 1 to be able to move up and down and rotate within the bushing 1, in the center of an inverted-frustum type material container 7 of the particle counting actuator 48. The vertical shaft 5 is at a lower end thereof provided with a stirring tip having a shape being a portion of a right circular cone envelope, that is, a middle shaft tube 27 of the stirring tip, having on each of two sides thereof a right-triangular frame 6, 8, 25 and 26 separately welded, is connected with a rotatable semicircular sheet like a hinge by using the bottom edge 8 and 25 of the two right-triangular frames as a pivot. An included angle α between a bottom surface with the bottom edge 8 and 25 of the two triangular frames and a front surface is equal to or less than 90°. The middle shaft tube 27 and the lower end of the vertical shaft 5 are secured in a manner of concave-convex fit via a positioning member.

The bushing 1 is mounted within a bearing seat 29 on the container lid 4 and able to rotate vertically. A portion of a lower portion of the bushing 1 extending out from the container lid 4 is provided with a gear 28 which forms a transmission pair together with a gear 3 on the motor 2 extending out from the container lid 4. The motor 2 is mounted on the container 4. A handwheel 30 has at a lower end thereof, which is mounted at the upper end of the vertical shaft and in concave-convex clearance fit with the vertical shaft 5, helical teeth forming a clutch together with helical teeth provided at an upper end of the bushing 1.

At a small end of the inverted-frustum type material container, there are two overlapped bottom portions. The upper bottom portion is integrated with the container, with a segment of cylinder 21 between the upper bottom portion and the container, one end of an upper bottom portion being integrally welded with the small end of the inverted-frustum type material container 7 while the other end thereof being welded with a circular flange 13. In the cylinder, there is a movable circular double-sheet component is provided. A horizontal shaft 12 and 35 (same as 16 and 38) in clearance fit with a corresponding hole on the cylindrical wall 21 is separately provided at two diameter ends and an extension line of the top sheet 37. The two sheets may rotate about the horizontal shaft 12 and 35. A short vertical shaft tube 34 is provided in the center of the lower surface of the top sheet 37. The bottom sheet 36 is mounted on the excircle of the short vertical shaft tube 34 and able to horizontally rotate about the short vertical shaft tube 34. A central hole is formed on the top sheet 37 with sectorial holes formed around the central hole. The bottom sheet 36 is sectorial, and has a magnet mounted below. A torque required by the rotation of the double-sheet component is provided by a rocker arm 11 mounted at one end of the horizontal shaft 12 extending out from the cylindrical wall 21. A fixed base 10 is provided outside the upper bottom portion, and the fixation of the double-sheet component is realized by a stretchable positioning pin 9 mounted on the rocker arm 11 and the fixed base 10 in a manner of concave-convex or friction fit in aid of magnetic suction. The rocker arm 11 is in concave-convex transition fit with the horizontal shaft 12. A gyratory magnet 22 is mounted on the periphery of the upper bottom portion. The peripheral magnet 22 has a same height as the magnet 23 of the bottom sheet. The normal working state of the double-sheet component is horizontal.

The lower bottom portion is completely independent. The upper and lower end faces of the lower bottom portion are also circular flanges 14 and 19 capable of being connected to the circular flange 13 of the bottom of the material container 7 and a circular flange of a downstream material processing container, a segment of cylindrical wall in which a movable circular double-sheet component is provided is reserved between the upper and lower end faces. Bearing seats 39 and 40, connected to the bottom sheet 31 via screws 41 and 42, are provided at two ends of the bottom sheet 31, and short shafts 43 and 44 in clearance fit with the bearing seats 39 and 40 are provided at two ends of the upper sheet 33. The upper sheet 33 is able to swing about the short shafts 43 and 44. The sheets 31 and 33 are of net structures or flat plates and works obliquely when in normal. A horizontal shaft 16 and 38 in clearance fit with a corresponding hole on the cylinder wall 20 is separately provided at two diameter ends and an extension line of the top sheet 31. The bottom sheet 31 is able to rotate about the horizontal shafts 16 and 38. A torque required by the rotation of the bottom sheet 31 is provided by a rocker arm 17 mounted at one end of the horizontal shaft 16 extending out from the cylinder wall 20. A sectorial fixed base 18 is provided outside the cylindrical wall 20. The fixation of the circular double-sheet component is realized by a stretchable positioning pin 9 mounted on the rocker arm 17 and the sectorial fixed base 18 in a manner of concave-convex or friction fit in aid of magnetic suction. The rocker arm 11 is in concave-convex transition fit with the horizontal shaft 16. The telescopic positioning pin 15 is in transition fit with the rocker arm 17. The lower bottom portion is the sensor platform.

In the electronic portion of the system, in the circular double-sheet component moving within the lower bottom portion, provided are a vibration or sound or pressure sensor 32, as well as an acceleration sensor and an infrared sensor.

The signal from the sensor 32 is transmitted to the signal count processing apparatus 45 which processes the signal and transmits the signal to the timer 47 or the motor drive 49. The timer 47 controls the startup or stop of the motor 2. The motor drive 49 processes the signal from the signal count processing apparatus 45 and then sends a signal to the motor 2. The motor 2 changes the rotating speed according to the signal to drive the vertical shaft 5 to change in the rotating speed.

The signal count processing apparatus 45 consists of a charge amplifier, a high-pass filter, a wave shaping circuit, a counting circuit, a feedback control circuit, a serial communication circuit, keys on a display screen and other components.

FIG. 1

电机驱动器 Motor drive
碎块计数执行机构 Particle counting actuator
定时器 Timer
传感器平台 Sensor platform
信号计数处理器 Signal count processing apparatus

The invention claimed is:

1. A particle counting and controlling system, comprising: a particle counting actuator, a sensing platform, a signal count processing apparatus, a motor driver and a timer, and wherein the particle counting actuator permits a passage of particles to the sensing platform, the sensing platform generates a first count signal and transmits the first count signal to the signal count processing apparatus, and the signal count processing apparatus calculates a value of quantity of the particles falling from the particle counting actuator per unit time according to the first count signal, and compares the value of quantity of the particles falling from the particle counting actuator per unit time with a predetermined value to get a ratio between the value of quantity of the particles falling from the particle counting actuator per unit time and the predetermined value, and the signal count processing apparatus sends a control signal to one of the timer and the motor driver based on the ratio, and wherein the timer controls the startup and stop of the motor driver according to the control signal, and wherein the motor driver sends a driving signal to the motor driver according to the control signal, and the motor driver changes a rotating speed according to the driving signal from the motor driver, so as to drive a vertical shaft of the particle counting actuator to change the rotating speed of the vertical shaft, and which results of change of the quantity of the particles falling from the particle counting actuator per unit time.

2. The particle counting and controlling system of claim 1, further comprising a bushing, and wherein the vertical shaft is located inside the particle counting actuator, wherein a portion of the vertical shaft is mounted within the bushing on a container lid, and wherein the portion of the vertical shaft is in clearance fit within the bushing to move up, down, and rotate within the bushing.

3. The particle counting and controlling system of claim 2, wherein the bushing is mounted within a bearing seat on the container lid, and wherein the container lid is disposed on top of the particle counting actuator, and wherein the bushing can rotate vertically.

4. The particle counting and controlling system of claim 2, wherein the bushing further comprises an upper end bushing and a lower end bushing, and wherein the lower end bushing extends below the container lid and comprises a pair of transmission gears connected to the spindle of the motor, and wherein the upper end bushing further comprises a handwheel in concave-convex clearance fit with the vertical shaft, and wherein the handwheel further comprises a helical teeth connected at the lower end to a clutch.

5. The particle counting and controlling system of claim 4, wherein when the clutch between the vertical shaft and the bushing is engaged, the rotation of the vertical shaft is driven by the motor via a gear, and when the clutch is disengaged, the rotation of the vertical shaft is driven by the handwheel.

6. The particle counting and control system of claim 1, wherein a distal end of the vertical shaft comprises a middle shaft tube, a plurality of right triangular frames connected to a side of the middle shaft tube, and a rotatable semicircular hinge sheet connected to the plurality of right triangular frames.

7. The particle counting and control system of claim 6, wherein an angle between a bottom surface and a front surface of a bottom edge of each of the plurality of right triangular frames is less than or equal to 90 degrees.

8. The particle counting and control system of claim 6, wherein the middle shaft tube and the lower end of the vertical shaft are secured in a concave-convex fit by a positioning member.

9. The particle counting and control system of claim 1, wherein the particle counting actuator comprises an inverted frustrum shaped container having two overlap bottom portions, wherein one end of an upper bottom portion is integrally connected with the inverted frustrum shaped container and the other end is connected with a circular flange.

10. The particle counting and control system of claim 9, wherein the inverted frustrum shaped container further comprises a middle portion having a thin cylindrical wall, and wherein a movable circular double-sheet component is provided.

11. The particle counting and control system of claim 1, wherein the particle counting actuator further comprises a double sheet component, and a short vertical shaft tube, and wherein the double sheet component comprises an upper bottom portion integrated with an inverted frustrum shaped container, and a lower bottom portion connected to the excircle of the short vertical shaft tube, and wherein the lower bottom portion is able to gyrate about the short vertical shaft tube.

12. The particle counting and control system of claim 11, wherein the upper bottom portion of the double sheet component further defines a central hole and at least one sectorial hole formed around the central hole, and the lower bottom portion of the double sheet component further defines at least one sectorial hole.

13. The particle counting and control system of claim 12, wherein a first magnet is mounted to the periphery of the upper bottom portion of the double sheet component and a second magnet is mounted to the lower bottom portion of the double sheet component, and wherein the first and the second magnets function to gyrate the upper bottom portion and the lower bottom portion of the double sheet component, respectively.

14. The particle counting and control system of claim 1, wherein the sensing platform comprises at least one sensor, a movable double sheet unit, and wherein the movable double sheet unit comprises an upper sheet, a lower sheet, and a means for rotating the lower sheet.

15. The particle counting unit of claim 14, wherein the sensing platform is connected to the particle counting actuator and a downstream material processing container.

16. The particle counting and control system of claim 14, wherein the at least one sensor is selected from at least one member of the group consisting of a vibration sensor, a sound sensor, a pressure sensor, an acceleration sensor, and an infrared sensor.

17. The particle counting and control system of claim 1, wherein the signal count processing apparatus further comprises a charge amplifier, a high-pass filter, a wave shaping circuit, a counting circuit, an alarm control circuit, a serial communication circuit, and a plurality of keys on a display screen.

* * * * *